United States Patent [19]

Fiasse

[11] Patent Number: 5,780,379
[45] Date of Patent: Jul. 14, 1998

[54] PROCESS FOR THE STEREOSPECIFIC POLYMERIZATION OF ALPHA-OLEFINS AND CATALYST SYSTEM WHICH CAN BE EMPLOYED FOR THIS POLYMERIZATION

[75] Inventor: Paul Fiasse, Brussels, Belgium

[73] Assignee: Solvay Polyolefins Europe-Belgium (Société Anonyme), Brussels, Belgium

[21] Appl. No.: 855,509

[22] Filed: May 13, 1997

Related U.S. Application Data

[60] Continuation of Ser. No. 487,339, Jun. 7, 1995, abandoned, which is a division of Ser. No. 879,444, May 1, 1992, abandoned, which is a continuation of Ser. No. 309,083, Feb. 10, 1989, abandoned, which is a continuation of Ser. No. 423,044, Oct. 18, 1989, abandoned, which is a continuation of Ser. No. 184,572, Apr. 21, 1988, abandoned, which is a continuation of Ser. No. 101,860, Sep. 25, 1987, abandoned.

[30] Foreign Application Priority Data

Mar. 9, 1988 [FR] France ............... 88 03160

[51] Int. Cl.$^6$ ............... C08F 4/44; C08F 4/02; B01J 31/00; B01J 37/00
[52] U.S. Cl. ............... 502/132; 502/121; 502/122; 502/123; 502/125; 502/126; 502/127; 526/137; 526/139; 526/140; 526/141; 526/142
[58] Field of Search ............... 502/113, 123, 502/124, 125, 126, 127, 110, 114, 121, 122, 132; 526/137, 139, 140, 141, 142

[56] References Cited

U.S. PATENT DOCUMENTS

| | | | |
|---|---|---|---|
| 4,136,243 | 1/1979 | Appleyard et al. | 526/139 |
| 4,203,867 | 5/1980 | Bye | 526/140 |
| 4,210,738 | 7/1980 | Hermans et al. | 526/152 |
| 4,213,878 | 7/1980 | Bye | 526/140 |
| 4,295,991 | 10/1981 | Wristers | 526/119 |
| 4,463,102 | 7/1984 | Foerster et al. | 502/127 |
| 4,478,989 | 10/1984 | Goodall et al. | 502/125 |
| 4,483,971 | 11/1984 | Sato et al. | 502/127 |
| 4,526,944 | 7/1985 | Staiger | 502/127 |
| 4,529,780 | 7/1985 | Foerster et al. | 502/127 |

FOREIGN PATENT DOCUMENTS

| | | | |
|---|---|---|---|
| 0261727 | 8/1988 | European Pat. Off. | |
| 2 253 030 | 6/1975 | France | |
| 30 10 871 | 10/1981 | Germany | 526/142 |
| 1 278 516 | 6/1972 | United Kingdom | |
| 2 110 703 | 6/1983 | United Kingdom | |

OTHER PUBLICATIONS

Kirk–Othmer Encyclopedia of Chemical Technology, Second Edition, vol. 8, p. 94 (1965).
Macromolecules, vol. 6, No. 6, pp. 925–926 (Nov.–Dec. 1973).
U.S. Patent No. 4,183,824 (Official Gazette, Jan. 15, 1980). Shiga et al.

Primary Examiner—Glenn Caldarola
Assistant Examiner—J. Pasterczyk
Attorney, Agent, or Firm—Spencer & Frank

[57] ABSTRACT

Process for the polymerization of alpha-olefins, which is carried out in the presence of a catalyst system comprising:

(1) a solid based on completed titanium trichloride;
(2) an organometallic compound of metals of groups IA, IIA, IIB and IIIB of the Periodic Table, and
(3) an electron-donor organic compound, the solid (1) based on complexed titanium trichloride having been preactivated by being brought into contact with a preactivator comprising the product of reaction of a trialkylaluminum or alkylaluminum chloride compound (a) and of a compound (b) chosen from hydroxyaromatic compounds whose hydroxyl group is sterically hindered, then isolating the predetermined solid (1) from the medium in which it was found.

This process enables propylene to be polymerized with an improved stereospecificity without any significant decrease in catalyst activity.

15 Claims, No Drawings

PROCESS FOR THE STEREOSPECIFIC POLYMERIZATION OF ALPHA-OLEFINS AND CATALYST SYSTEM WHICH CAN BE EMPLOYED FOR THIS POLYMERIZATION

This application is a Continuation of application Ser. No. 08/487,339, filed Jun. 7, 1995, now abandoned which is a divisional of application Ser. No. 07/879,444, filed May 1, 1992 now abandoned which is a continuation of application Ser. No. 07/309,083, filed Feb. 10, 1989 now abandoned which is a continuation of application Ser. No. 07/423,044, filed Oct. 18, 1989 (now abandoned) which is a continuation of application Ser. No. 07/184,572, filed Apr. 21, 1988 (now abandoned) which is a continuation of application Ser. No. 07/101,860 filed Sep. 25, 1987 (now abandoned).

BACKGROUND OF THE INVENTION

1. Field of the Invention

The present invention relates to a process for the stereospecific polymerization of alpha-olefins, and catalyst system which can be employed for this polymerization.

2. Technology Review

It is known to polymerize stereospecifically alpha-olefins such as propylene, using a catalyst system comprising a solid constituent based on titanium trichloride and an activator consisting of an organometallic compound such as alkylaluminium chloride.

Patent BE-A-780,758 (Solvay & Cie) has described superactive solid catalyst complexes based on $TiCl_3$ of high internal porosity, enabling propylene polymers of very good stereoregularity to be obtained.

These solid catalyst complexes are unique in the extremely important advantages which they provide. Their activity in polymerization is so high that the catalyst residues remaining in the polyolefin are in a quantity which is so low that they need no longer be removed.

Their stereospecificity is such that the polymer obtained contains only a very low proportion of amorphous fraction. Lastly, since the particles of these catalyst complexes are in the form of uniform spheres, the polymer obtained is also in the form of uniform spherical particles, of high apparent specific weight and of good pourability.

Nevertheless, polyolefin manufacturers continue to want to improve the production efficiency of their polymerization plants still further, this improvement in production efficiency being reflected in practice in a shortening of the residence time of the polymer in the polymerization plants or in a reduction in the volume of the latter.

A simple means of improving the production efficiency consists in performing the polymerization at higher temperature. However, an unfortunate consequence of raising the polymerization temperature is a decrease in the stereospecificity of the catalyst complexes.

Attempts have been made to overcome this disadvantage by performing the polymerization of propylene in the presence of catalyst systems comprising the superactive solid catalyst complexes referred to above, modified by the introduction into the polymerization medium of a third constituent, which is generally an electron-donor compound (a Lewis base). A very large number of electron-donor compounds of various kinds have already been proposed as third constituents capable of increasing the stereospecificity of these catalyst systems (see, for example, Patent BE-A-822,941 (ICI)). However, the improvement in stereospecificity which is obtained by virtue of the introduction of such electron-donor compounds into the polymerization environment is marked only when the quantity of electron-donor compound is relatively high (the weight of the electron-donor compound is generally at least equal to the weight of the solid catalyst complex present in the environment, and frequently much higher). Detrimental secondary effects are then found, such as an unacceptable decrease in the catalyst efficiency and the appearance of discolorations in the polymer collected.

It has now been found that the combination of certain catalytic solids based on complexed titanium trichloride with an organometallic activator and with a third constituent chosen from certain classes of electron-donor compounds makes it possible to obtain catalyst systems with improved stereospecificity without an unacceptable accompanying reduction in the catalyst efficiency.

SUMMARY OF THE INVENTION

The present invention consequently relates to a process for the polymerization of alpha-olefins, carried out in the presence of a catalyst system comprising:

(1) a solid based on complexed titanium trichloride, (2) an organometallic compound of metals of groups IA, IIA, IIB and IIIB of the Periodic Table, and (3) an organic electron-donor compound.

The solid (1) based on complexed titanium trichloride has been preactivated by being brought into contact with a preactivator comprising the product of reaction of an organoaluminium compound (a) and of a compound (b) chosen from hydroxyaromatic compounds whose hydroxyl group is sterically hindered.

DETAILED DESCRIPTION OF THE INVENTION

The preactivated solid (1) based on complexed titanium trichloride which can be employed in the catalyst system according to the invention (referred to hereinafter as preactivated solid (1)) is the result of the preactivation, described later, of a precursor (p) based on complexed titanium trichloride, which may be obtained by any known process. It is generally preferred to employ a precursor (p) obtained by a process involving an initial reduction of a titanium compound chosen from the tetrahalides, the tetrahydrocarbyloxides and mixtures thereof. Examples of titanium tetrahalides which may be mentioned are the tetraiodide, tetrabromide and tetrachloride. Examples of titanium tetrahydrocarbyloxides which may be mentioned are tetraalkoxides such as the tetramethoxy-, tetraisopropoxy- and tetra-n-butoxy-titaniums, and tetraaryloxides such as the tetraphenoxy-, tetracresoxy- and tetranaphthoxytitaniums, for example.

Among the titanium compounds referred to above, preference is given to titanium tetrahalides and, among the latter, to titanium tetrachloride.

The reduction can be carried out using hydrogen or metals such as magnesium and, preferably, aluminium, in particular when the titanium compound is a titanium tetrahalide. However, it is preferable to perform the reduction of the titanium compound using an organometallic reducing agent which may be, for example, an organomagnesium reducing agent.

The best results are obtained when the reduction of the titanium compound is carried out using organoaluminium reducing agents (r).

The organoaluminium reducing agents (r) which can be preferably employed are compounds which contain at least one hydrocarbon radical attached directly to the aluminium atom. Examples of compounds of this type are mono-, di- and trialkylaluminiums whose alkyl radicals contain from 1 to 12, and preferably from 1 to 6, carbon atoms, such as triethylaluminium, the isoprenylaluminiums, diisobutylaluminium hydride and ethoxydiethylaluminium. With the compounds of this type, the best results are obtained with alkylaluminium chlorides, particularly with diethylaluminium chloride and with ethylaluminium sesquichloride.

In order to obtain the precursors (p) of the preactivated solids (1) of the catalyst systems which can be employed according to the invention, the reduced solids referred to above are subjected to a treatment with at least one complexing agent which is generally chosen from organic compounds containing one or more atoms or groups which have one or more free electron pairs capable of coordinating with the titanium or aluminium atoms present in the titanium or aluminium compounds (r). The complexing agent is preferably chosen from the group of aliphatic ethers, and more particularly from those whose aliphatic radicals contain from 2 to 8 carbon atoms, preferably 4 to 6 carbon atoms. A typical example of an aliphatic ether which gives very good results is diisoamyl ether.

These treatments with complexing agents capable of stabilizing or improving the efficiency and/or the stereospecificity of the solid catalysts are well known and have been fully described in the literature.

Thus, the treatment with the complexing agent may consist of milling the reduced solid in the presence of the complexing agent. It may consist of a heat treatment of the reduced solid in the presence of the complexing agent. It may also consist of extractive washings of the reduced solid, in the presence of mixed solvents comprising a liquid hydrocarbon compound and a polar auxiliary solvent, for example an ether. The reduction of the titanium compound, particularly of the tetrachloride, may also be carried out with the organoaluminium reducing agent (r), in the presence of the complexing agent, for example by adding to the titanium tetrachloride a hydrocarbon solution of the product of reaction of the complexing agent with this reducing agent, and the reduced solid thus obtained can then be subjected to a heat treatment in the absence of a complexing agent or in the presence of a new quantity of complexing agent, which is identical with or different from the preceding one. The treatment with the complexing agent can also be carried out with a quantity of the latter which is sufficient to form a homogeneous solution of the solid based on titanium trichloride and to reprecipitate, by heating, the solid thus dissolved.

In order to prepare the precursor (p), the treatment using the complexing agent may be combined with, or followed by, an activation treatment. These activation treatments are also well known and have also been described in the literature. They are generally carried out using at least one agent chosen from inorganic halogen compounds, organic halogen compounds, interhalogen compounds and halogens. Among these agents there may be mentioned:

- as inorganic halogen compounds, metal and nonmetal halides, such as, for example, titanium halides and silicon halides;
- as organic halogen compounds, halogenated hydrocarbons, such as, for example, halogenated alkanes and carbon tetrahalides;
- as interhalogen compounds, for example, iodine chloride and bromide; and
- as halides, chlorine, bromine and iodine.

Examples of agents which are highly suitable for the activation treatment are titanium tetrachloride, silicon tetrachloride, iodobutane, monochloroethane, hexachloroethane, chloromethylbenzene, carbon tetrachloride, iodine chloride and iodine. The best results have been obtained with titanium tetrachloride.

The physical form in which the completing agents and the agents employed for a possible activation treatment are to be found is not critical for the preparation of the precursor. These agents may be used in gaseous form, or in liquid form, the latter being the most usual form in which they exist in normal temperature and pressure conditions. The treatment with the complexing agent and the optional activation treatment may also be carried out in the presence of an inert hydrocarbon diluent, generally chosen from liquid aliphatic, cycloaliphatic and aromatic hydrocarbons, such as liquid alkanes and isoalkanes and benzene.

Details relating to the operating conditions of the most common complexing and activating treatments can be found particularly in Patent BE-A-864,708 (Sumitomo Chemical Company Ltd.), in Patent U.S. Pat. No. 4,295,991 (Exxon Research and Engineering Co.) and in the documents referred to in the latter.

At any time during its preparation, after the reduction or complexing step, or after the optional activation step, but preferably after the reduction step, the precursor (p) may be subjected to a treatment aimed at reducing the friability of its constituent particles. This treatment, referred to as "prepolymerization", consists in bringing the solid into contact with a lower alpha-monoolefin such as ethylene or propylene, under polymerizing conditions, so as to obtain a solid generally containing approximately between 5 and 500% by weight of "prepolymerized" alpha-monoolefin. This "prepolymerization" may be advantageously carried out in a suspension of the solid in the inert hydrocarbon diluent such as defined above, for a period which is sufficient to obtain the desired quantity of prepolymerized alpha-monoolefin on the solid. The precursor (p) obtained according to this alternative process is less friable and makes it possible to obtain polymers with good morphology, even when polymerization is performed at a relatively elevated temperature.

According to the invention, the precursor (p) is, at any time during its preparation, but preferably at the end of the latter, placed in contact with a preactivator comprising the product of reaction of an organoaluminium compound (a) and of a compond (b) chosen from hydroxy-aromatic compounds whose hydroxyl group is sterically hindered. This bringing of the preactivator into contact with the precursor (p) is generally carried out by placing the latter, preferably isolated from the medium in which it has been prepared, and washed with an inert hydrocarbon diluent such as defined above, in contact with the former. The organoaluminium compound (a) employed for preparing the preactivator is preferably chosen from trialkylaluminiums and alkylaluminium chlorides. Among these compounds, the best results have been obtained with triethylaluminium and, above all, with diethylaluminium chloride. The hydroxyaromatic compound (b) employed for preparing the preactivator is preferably chosen from phenols di-tert-alkylated in the ortho positions relative to the hydroxyl groups and esters of 3-(3',5'-di-tert-butyl-4'-hydroxyphenyl)propionic acid. Among these compounds, the best results have been obtained with n-octadecyl 3-(3',5'-di-tert-butyl-4'-hydroxyphenyl)propionate.

Other details concerning the bringing of the precursor (p) into contact with the preactivator defined above, especially the nature of the organoaluminium and hydroxyaromatic compounds, concerning the operating conditions in which this is done and concerning the texture of the preactivated solid (1) obtained, will be found in the French Patent Application filed on 26 Sep. 1986 under number 86/13,649 (Solvay & Cie) whose content is incorporated by reference in the present description.

A preferred method of preparation of the precursor (p) which, preactivated as indicated above, constitutes the solid (1) forming part of the composition of the catalyst system which can be employed according to the invention, has been described in Patent BE-A-780,758 (Solvay & Cie). This method comprises the reduction of titanium tetrachloride with an organoaluminium reducing agent (r) which, in this case, is preferably a dialkylaluminium chloride whose alkyl chains contain from 2 to 6 carbon atoms, under mild conditions. After an optional heat treatment of the reduced solid thus obtained, the latter is subjected to a treatment with a complexing agent such as defined above. Lastly, a treatment with titanium tetrachloride is carried out and the solid based on complexed titanium trichloride thus formed is separated off and is generally washed with an inert hydrocarbon diluent such as defined above, preferably chosen from liquid aliphatic hydrocarbons containing from 3 to 12 carbon atoms, and which is, furthermore, the diluent which may be employed throughout the preparation of the said solid.

The preferred method of preparation defined in the preceding paragraph results in precursor (p) particles which are also described in Patent BE-A-780,758. These particles are spherical and generally have a diameter of between 5 and 100 microns and in most cases between 10 and 50 microns. They consist of an agglomerate of microparticles which are also spherical, which have a diameter of between 0.05 and 1 micron, in most cases between 0.1 and 0.3 microns and which are extremely porous. As a result, the particles have a specific surface which is higher than 75 m$^2$/g and which in most cases lies between 100 and 250 m$^2$/g, and a total porosity higher than 0.15 cm$^3$/g and in most cases between 0.20 and 0.35 cm$^3$/g. The internal porosity of the microparticles constitutes the largest contribution to this total porosity of the particles, as shown by the high value of the pore volume corresponding to the pores less than 200 Å in diameter, which is higher than 0.11 cm$^3$/g and in most cases between 0.16 and 0.31 cm$^3$/g.

The precursors (p) obtained according to the method of preparation described in Patent BE-A-780,758, the preferred operating conditions being chosen, correspond to the formula:

TiCl$_3$.(AlRCl$_2$)$_x$Ly where R is an alkyl radical containing from 2 to 6 carbon atoms, L is a complexing agent such as defined above, x is any number smaller than 0.20 and y any number greater than 0.009 and generally smaller than 0.20.

By way of an alternative form of this method of preparation, there may be mentioned that referred to earlier, consisting in "prepolymerizing" the reduced solid, after the optional heat treatment and before the treatment using the complexing agent, with a lower alpha-mono-olefin (propylene) under polymerizing conditions. This "prepolymerization" is carried out in a suspension of the reduced solid in the inert hydrocarbon diluent such as defined above, between 20° and approximately 80° C., for a period which is generally between 1 minute and 5 hours.

Whatever the alternative form adopted for the preparation of the preactivated solid (1), the latter is finally isolated from the medium in which it was formed, and is generally then washed with an inert hydrocarbon diluent of the same kind as those which may have been involved in its preparation.

The preactivated solid (1) forming part of the catalyst system which may be employed according to the invention, isolated and washed, may then be optionally dried in a conventional manner.

After having been washed and optionally dried, the preactivated solid (1) of the catalyst system according to the invention may be immediately placed back in contact with an inert hydrocarbon diluent such as those which were defined above and which can also be employed as diluents in the suspension polymerization. The preactivated solid (1) according to the invention may also be subjected to a "prepolymerization" treatment such as described above in connection with the precursor (p). It may be stored in a diluent of this kind, or in dry form, preferably cold, for long periods, without losing its qualities.

For the polymerization, the catalyst system according to the invention contains, in addition to the abovementioned solid (1), a compound (2) which is chosen from organometallic compounds of metals of groups IA, IIA, IIB and IIIB of the Periodic Table (version published in the Kirk-Othmer Encyclopedia of Chemical Technology, second complete revised edition, volume 8, 1965, page 94) and preferably from the compounds of formula:

AlR'$_m$X$_{3-m}$ where

R' is a hydrocarbon radical containing from 1 to 18 carbon atoms and preferably from 1 to 12 carbon atoms, chosen from alkyl, aryl, arylalkyl, alkylaryl and cycloalkyl radicals; the best results are obtained when R' is chosen from alkyl radicals containing from 2 to 6 carbon atoms;

Y is a halogen chosen from fluorine, chlorine, bromine and iodine; the best results are obtained when X is chlorine; and m is any number such that 0<m≦3 and preferably such that 1.5≦m≦2.5; the best results are obtained when m is equal to 2.

Diethylaluminium chloride (DEAC) ensures maximum activity and maximum stereospecificity of the catalyst system.

In addition to the preactivated solid (1) and the organometallic compound (2), the catalyst system according to the invention comprises a compound (3) which is an electron-donor organic compound.

The term "electron-donor organic compound" is intended to denote any organic compound comprising at least one atom or group which has at least one pair of free electrons capable of ensuring coordination with titanium or the metal of compound (2) and whose molecule contains from 1 to 30 and preferably from 2 to 20 carbon atoms per electron-donor atom or group.

The electron-donor organic compounds (3) are generally chosen from organic compounds containing oxygen, organic compounds containing nitrogen, organic compounds containing phosphorus, and organic compounds containing sulphur.

It is to be clearly understood that the above definitions include not only the compounds containing only a single electron-donor atom chosen from oxygen, nitrogen, phosphorus and sulphur, or a single electron-donor group containing such atoms, but also compounds containing a number of identical or different electron-donor atoms or groups chosen from the atoms and groups defined above.

Although all the electron-donor organic compounds defined above provide the catalyst systems according to the invention with an advantageous compromise of stereospecificity and catalytic activity, it is preferable to choose the electron-donor organic compound (3) from compounds containing oxygen, nitrogen and/or phosphorus.

Examples of electron-donor organic compounds (3) containing oxygen and capable of being employed according to the invention are esters, ethers, ketones, aldehydes, alcohols, acetals and carboxylic acids. Among these compounds, esters and ethers are preferred.

By way of esters which can be employed there may be mentioned esters of mono- and polycarboxylic acids and especially esters of aliphatic carboxylic acids, esters of olefinic carboxylic acids, esters of alicyclic carboxylic acids, esters of aromatic carboxylic acids and cyclic esters derived from hydroxyacids. Examples of esters which can be employed include methyl acetate, ethyl acetate, phenyl acetate, ethyl chloroacetate, methyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, ethyl methyl phthalate, diethyl phthalate, di-n-propyl phthalate, diisobutyl phthalate, di-n-hexyl phthalate, di-n-octyl phthalate, diphenyl phthalate, β-propiolactone, α-butyrolactone and ε-caprolactone.

Among all the esters which can be employed, those preferred are esters of olefinic carboxylic acids, such as acrylates and methacrylates and esters of aromatic carboxylic acids, such as benzoates, toluates and phthalates.

By way of ethers which can be employed there may be mentioned aliphatic monoethers, olefinic monoethers, aromatic monoethers, cyclic monoethers, dicyclic monoethers and polyethers. Examples of ethers which can be employed include diethyl ether, di-n-propyl ether, diisopropyl ether, di-n-butyl ether, di-n-amyl ether, diisoamyl ether, di-n-hexyl ether, di-n-octyl ether, diiso-octyl ether, ethyl n-butyl ether, n-amyl n-butyl ether, divinyl ether, diallyl ether, butyl allyl ether, di-butenyl ether, dicyclohexyl ether, dibenzyl ether, di-phenyl ether, ethylphenyl ether, phenyl benzyl ether, octenyl benzyl ether, propylene oxide, tetrahydrofuran, 1,4-dioxane, ethylene glycol monomethyl ether, ethylene glycol dimethyl ether, tetraethylene glycol dimethyl ether, tetraethylene glycol diethyl ether, di(2-methoxyethyl) ether and dimethoxypropane.

Among all the ethers which can be employed, advantageous results have been noted with polyethers, in particular with di- and triethers.

Examples of electron-donor organic compounds (3) containing nitrogen are amines, imines, amides, imides, isocyanates and nitriles. Among these compounds, the amines are preferred. As amines which can be employed there may be mentioned aliphatic primary amines, alicyclic primary amines, aromatic primary amines, heterocyclic primary amines, aliphatic secondary amines, alicyclic secondary amines, aromatic secondary amines, heterocyclic secondary amines, aliphatic tertiary amines, alicyclic tertiary amines, aromatic tertiary amines, heterocyclic tertiary bases, amino derivatives of carboxylic acids, amino derivatives of alcohols, amino derivatives of aldehydes, amino derivatives of quinones, amino derivatives of ketones and amino derivatives of ethers. Examples of amines which can be employed include ethylamine, butylamine, ethylenediamine, cyclohexylamine, 4,4'-diaminodicyclohexylmethane, aniline, o-, m- and p-toluidines, benzylamine, 4,4'-methylenedianiline, p-phenylenediamine, m-xylylenediamine, 2,6-diaminopyridine, diethylamine, diphenylamine, piperidine, piperazine, triethylamine, tributylamine, N,N,N',N'-tetramethylenediamine, dimethylaniline, triphenylamine, pyridine and its alkylated derivatives such as α, β- and γ-picolines and, for example 2,4,6-trimethylpyridine, quinoline, glycine, proline, lysine, 3,5-diaminobenzoic acid, mono-, di- and triethanolamines, p-aminobenzaldehyde, α- and β-aminoanthraquinones, 4,4'-diaminobenzophenone and di(4-aminophenyl) ether.

Among all the amines which can be employed, those preferred are tertiary amines and bases and particularly pyridine and its derivatives.

Examples of electron-donor organic compounds (3) containing phosphorus are phosphites, phosphonites, phosphinites, phosphates and organophosphine oxide derivatives. Among these compounds phosphites and organophosphine oxide derivatives, particularly phosphoramides, are preferred.

As phosphites which can be employed, there may be mentioned alkyl phosphites, cycloalkyl phosphites, aryl phosphites, arylalkyl phosphites and alkylaryl phosphites.

Examples of phosphites which can be employed include trimethyl phosphite, triethyl phosphite, tributyl phosphite, diphenyl cyclohexyl phosphite, triphenyl phosphite, tribenzyl phosphite and diphenyl propyl phosphite.

Among all the phosphites which can be employed, alkyl phosphites are preferred.

As organophosphine oxide derivatives which can be employed there may be mentioned trialkyl-, triaryl-, dialkoxyalkyl-, diaryloxyalkyl- and dialkylaminoalkoxyphosphine oxides, as well as N-alkyl-, N-cycloalkyl-, N-aryl-, N-arylalkyl-, N-alkylaryl- and substituted N-alkylaminophosphoramides.

Examples of organophosphine oxide derivatives which can be employed are dimethoxyethylphosphine oxide, diethoxyethylphosphine oxide, dibutoxyethylphosphine oxide, dibutoxypropylphosphine oxide, dibenzyloxyethylphosphine oxide, triphenylphosphine oxide and bis(dimethylamino)ethoxyphosphine oxide; tris(N,N-dimethyl)phosphoramide, tris(N,N-dicyclopentyl)phosphoramide, tris(N,N-dibenzyl)phosphoramide, tris(N,N-dieicosyl)phosphoramide, tris(N,N-di-4,5-dipentyl-2-naphthyl)phosphoramide, tris(N,N-diphenyl)phosphoramide, tris(N,N-diisobutyl)phosphoramide, tris(N,N-di-3-octylphenyl)phosphoramide, tris(N,N-di-2-phenylcyclohexyl)phosphoramide, N,N-dimethylbis-(N',N'-methyl-N"-β-dimethylaminoethyl)phosphoramide, octamethylpyrophosphoramide and 2-oxy-2-dimethylamino-1,3-dimethyl-1,3,2-diazophospholidine.

Among all the organophosphine oxide derivatives which can be employed, those preferred are N-alkyl substituted phosphoramides and particularly tris(N,N-dimethyl) phosphoramide (or hexamethylphosphoramide).

Among all the electron-donor organic compounds (3) described and listed above, it has been found that certain compounds belonging to the groups of electron-donor organic compounds containing nitrogen and to the electron-donor organic compounds containing phosphorus make it possible to obtain, together with the preactivated solids (1) according to the invention, catalyst systems of considerably increased stereospecificity, combined with a catalyst activity which is at least that obtained in the absence of compound (3), all other conditions being unchanged. These compounds (3) containing nitrogen are tertiary amines and bases, most particularly pyridine and its derivatives, and these compounds (3) containing phosphorus are phosphites, most particularly alkyl phosphites, as well as organophosphine oxide derivatives, most particularly hexamethylphosphoramide which, furthermore, results in polymers with a broadened molecular weight distribution.

The preactivated solid (1), the organometallic compound (2) and the electron-donor organic compound (3) may be added separately and in any order to the polymerization medium (described hereinafter).

However, a preliminary contact of the solid (1) with the compound (2), of the solid (1) with the compound (3), of the compound (2) with the compound (3), or else of the three constituents together, may be also effected before they are introduced into the polymerization medium.

It is possible, without disadvantage, particularly when the polymerization is carried out continuously, to effect a preliminary contact of the compound (2) with the compound (3) before they are added to the solid (1), suspended beforehand in the hydrocarbon diluent which has been used to prepare it or has been introduced beforehand into the polymerization medium.

This preliminary contact is generally effected at a temperature of between −40° and 80° C., for a period which depends on this temperature and which can range from a few minutes to several hours, or even several days.

This preliminary contact can be effected by placing the compound (2) and the compound (3) in solution in a hydrocarbon diluent such as those mentioned above or by bringing solutions of these compounds in such a diluent into contact; the formation of a reaction product or of a complex during this preliminary contact between the compounds (2) and (3) is not ruled out and generally has no negative effect on the properties of the catalyst system.

The catalyst systems comprising the constituents (1), (2) and (3), defined and combined as described above, are applied to the polymerization of terminally unsaturated olefins whose molecule contains from 2 to 18 and preferably from 2 to 6 carbon atoms, such as ethylene, propylene, 1-butene, 1-pentene, methyl-1-butenes, 1-hexene, 3- and 4-methyl-1-pentenes and vinylcyclohexene. They are of particular interest for the stereospecific polymerization of propylene, of 1-butene and of 4-methyl-1-pentene to crystalline, highly isotactic polymers. They are also applied to the copolymerization of these alpha-olefins with each other and with diolefins containing from 4 to 18 carbon atoms. The diolefins are preferably unconjugated aliphatic diolefins such as 1,4-hexadiene, unconjugated monocyclic diolefins such as 4-vinylcyclohexene, alicyclic diolefins which have an endocyclic bridge such as dicyclopentadiene, methylene- and ethylenenorbornene, and conjugated aliphatic diolefins such as butadiene or isoprene.

They apply, furthermore, to the manufacture of so-called block copolymers which are made up of alpha-olefins and diolefins. These block copolymers consist of sequences of chain blocks of variable lengths; each block consists of a homopolymer of an alpha-olefin or of a random copolymer comprising an alpha-olefin and at least one comonomer chosen from alpha-olefins and diolefins. The alpha-olefins and the diolefins are chosen from those mentioned above.

The catalyst systems according to the invention are particularly suitable for the manufacture of propylene homopolymers and copolymers containing a total of at least 50% by weight of propylene and preferably 75% by weight of propylene.

The polymerization may be carried out according to any known process: in solution or in suspension in an inert hydrocarbon solvent or diluent, such as those defined in connection with the preparation of the constituent (a), and which is preferably chosen from butane, pentane, hexane, heptane, cyclohexane, methylcyclohexane or mixtures thereof. The polymerization can also advantageously be carried out in the monomer or one of the monomers which is kept in the liquid state, or else in gaseous phase.

The polymerization temperature is generally chosen between 20° and 200° C. and preferably between 40° and 90° C., the best results being obtained between 50° and 85° C. The pressure is generally chosen between atmospheric pressure and 50 atmospheres, and preferably between 10 and 40 atmospheres. This pressure is, of course, a function of the temperature employed.

The polymerization may be carried out continuously or noncontinuously.

The preparation of so-called block copolymers may also be carried out according to known processes. It is preferred to employ a two-step process, consisting in polymerizing an alpha-olefin, generally propylene, according to the method described previously in the case of homopolymerization. The other alpha-olefin and/or diolefin, generally ethylene, is then polymerized in the presence of the still active homopolymer chain. This second polymerization can be performed after the monomer which has not reacted during the first step has been completely or partially removed.

The quantity of preactivated solid (1) which is employed is determined as a function of its $TiCl_3$ content. It is generally chosen so that the concentration of the polymerization medium is higher than 0.01 mmol of $TiCl_3$ per liter of diluent, of liquid monomer or of reactor volume, and preferably higher than 0.05 mmol per liter.

The total quantity of organometallic compound (2) employed is not critical; it is generally higher than 0.1 mmol per liter of diluent, of liquid monomer, or of reactor volume, preferably higher than 0.5 mmol per liter.

The total quantity of electron-donor organic compound (3) employed is not critical either; nevertheless, it is preferred not to employ a quantity of compound (3) which is excessive in relation to the total quantity of compound (2).

The ratio of the quantities of compound (2) and of solid (1) is not critical either. These quantities are generally chosen so that the atomic ratio of the metal present in the compound (2) to the titanium present in the solid (1) should be between 0.5 and 20 gram-atoms/gram-atoms (g-at./g-at.) and preferably between 1 and 15 g-at./g-at. The best results are obtained when this atomic ratio is between 2 g-at./g-at. and 12 g-at./g-at.

The ratio of the quantities of compound (3) and of compound (2), expressed in moles of compound (3) per mole of compound (2) is generally between 0.001 and 5, preferably between 0.005 and 1. The best results are obtained when this ratio is between 0.01 and 0.5.

The molecular weight of the polymers manufactured according to the process of the invention may be controlled by the addition to the polymerization medium of one or more molecular weight regulators such as hydrogen, diethylzinc, alcohols, ethers and alkyl halides.

EXAMPLES

The following examples are used to illustrate the invention.

The meaning of the symbols employed in these examples, the units expressing the quantities referred to and the methods of measuring these quantities are explained below.

$\alpha$=catalyst activity, conventionally expressed in grams of polymer insoluble in the polymerization medium, which are obtained per hour and per gram of $TiCl_3$ present in the preactivated solid catalyst. This activity is assessed indirectly from the determination of the residual titanium content of the polymer, using x-ray fluorescence.

itf=molar fraction of isotactic triads (block sequence of three propylene monomer units in a meso configuration) of the total polymer. This fraction is determined by $^{13}C$ NMR, as described in Macromolecules, volume 6, no. 6, page 925 (1973) and in references (3) to (9) in this publication.

I.I.=isotacticity index of the polymer, assessed via the fraction of the latter, expressed in % relative to the total quantity of the solid polymer collected, which is insoluble in boiling heptane.

U=(Mw/Mn)−1=ratio of the weight-average molecular weight Mw to the number-average molecular weight Mn of the polymer, reduced by unity; the value of this ratio represents the molecular weight distribution of the polymer (high values corresponding to broad distributions and vice versa);

Mw and Mn and their ratio are determined from data from gel permeation chromatography fractionation of a solution containing 1 g/kg of polymer in 1,2,4-trichlorobenzene at 135° C. (Waters 200 chromatograph).

MFI=melt flow index, measured under a 2.16 kg load at 230° C., and expressed in g/10 min (ASTM standard D 1238).

ASW=apparent specific weight of the insoluble polymer fraction, measured after settling and expressed in g/l.

Example 1 (reference)

This example is given by way of comparison.

A—Preparation of the precursor (solid based on complex titanium trichloride)

1. Reduction 90 ml of dry hexane and 60 ml of pure $TiCl_4$ are introduced under nitrogen atmosphere into an 800-ml reactor fitted with a 2-bladed stirrer rotating at 400 revolutions/min. This hexane-$TiCl_4$ solution is cooled to 0 (±1)°C. A solution consisting of 190 ml of hexane and of 70 ml of diethylaluminium chloride (DEAC) is added to it over 4 h, while the temperature in the reactor is maintained at 0 (±1)°C.

After addition of DEAC-hexane solution, the reaction medium, consisting of a suspension of fine particles, is kept stirred at 1 (±1)°C. for 15 min, and is then heated to 25° C. over 1 h and kept for 1 h at this temperature and is then heated over approximately 1 h to 65° C. The medium is kept stirred at 65° C. for 2 h.

2. Prepolymerization

The suspension obtained is then cooled to approximately 55° C. Propylene at a pressure of 2 bars is then introduced into the gas space of the reactor. This introduction is continued for a sufficient time (approximately 45 minutes) to obtain 70 g of polymerized propylene per kg of solid. The suspension of the solid "pre-polymerized" in this way is then cooled to 40° C.

The liquid phase is then separated from the solid and the solid product is washed 7 times with 200 ml of dry hexane, the solid being resuspended during each washing.

3. Treatment with the complexing agent

The "prepolymerized" reduced solid obtained is suspended in 456 ml of diluent (hexane) and 86 ml of diisoamyl ether (DIAE) are added to it. The suspension is stirred at 50° C. for 1 h. The solid treated in this manner is then separated from the liquid phase.

4. Treatment with $TiCl_4$

The treated solid is resuspended in 210 ml of hexane and 52 ml of $TiCl_4$ are added to it; the suspension is kept stirred (150 revolutions/min) at 70° C. for 2 h. The liquid phase is then removed by filtration, and the solid (precursor) based on complexed titanium trichloride is washed 14 times with 270 ml of hexane.

B—Preactivation 74 g of the solid precursor (containing approximately 780 g of $TiCl_3$/kg) suspended in 280 ml of hexane are introduced into an 800-ml reactor fitted with a bladed stirrer rotating at 150 revolutions/min. Into this reactor are introduced slowly (30 minutes) 120 ml of a hexane solution of a preactivator prepared beforehand by mixing, per liter of hexane, 80 g of DEAC (compound (a)) and 176.2 g of n-octadecyl 3-(3',5'-di-tert-butyl-4-hydroxyphenyl)propionate, marketed under the name Irganox 1076 by Ciba-Geigy (compound (b)). The molar ratio of the compounds (a) and (b) used to prepare the preactivator is therefore 2, and the molar ratio of the preactivator to the precursor (expressed in moles of compound (a) used initially per mole of $TiCl_3$ present in the precursor) has a value of 0.2.

The preactivator solution is introduced into the reactor only 15 minutes after the end of the gas release observed during the mixing of the compound (a) and of the compound (b).

The suspension to which the preactivator has thus been added is kept stirred at 30° C. for 1 hour.

After decanting, the resultant preactivated solid catalyst is washed 5 times using 100 ml of dry hexane, the solid being resuspended during each washing, and is then dried by purging with nitrogen in a fluidized bed at 50° C.

The preactivated solid catalyst thus obtained contains 616 g of $TiCl_3$ per kg.

C—Polymerization of propylene in suspension in liquid monomer in the presence of the preactivated solid catalyst The following are introduced, under nitrogen purging, into a 5-l autoclave, dried beforehand and maintained under a dry nitrogen atmosphere:

400 mg of DEAC (in the form of a hexane solution at a concentration of 200 g/l) marketed by Schering (the atomic ratio Cl/Al is adjusted to 1.02 by adding ethylaluminium dichloride);

100 mg of preactivated solid catalyst (the molar ratio of DEAC to the $TiCl_3$ present in the solid is thus approximately 8);

hydrogen under a partial pressure of 1 bar; and 3 l of liquid propylene.

The reactor is maintained at 70° C. for 3 hours, with stirring. The excess propylene is then degassed and the polypropylene (PP) formed is recovered.

The activity a of the preactivated solid catalyst is 4312.

The polypropylene obtained exhibits the following characteristics:

itf=0.946
I.I.=96.6%
$U_n$=7.6
MFI=11.6 g/10 min
ASW=515 g/l

Examples 2 to 9 (according to the invention)

Polymerization tests are carried out under the general conditions described in Example 1, part C in the presence of the preactivated solid catalyst prepared as described in Example 1, parts A and B. However, the polymerization is carried out in the additional presence of an electron-donor organic compound (3) whose nature, the quantity employed and the method of introduction are indicated in the table below and in the comments which accompany it.

The results of the polymerization trials are also set out in the table.

TABLE

| Example No. | 2 | 3 | 4 | 5 |
|---|---|---|---|---|
| Nature of the electron-donor organic compound (3) | methyl methacrylate | methyl p-toluate | diisobutyl phthalate | bis(2-methoxyethyl) ether (diglyme) |
|  |  |  | 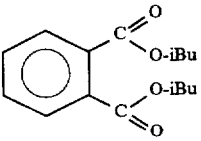 | $CH_3-O-(CH_2)_2-O-(CH_2)_2-O-CH_3$ |
| Quantity of compound (3) (molar ratio compound (3)/DEAC) | 0.02 | 0.02 | 0.02 | 0.05 |
| Method of introduction of the compound | (a) | (a) | (b) | (a) |
| $\alpha$ (gPP/gTiCl$_3$ × h) | 4059 | 4312 | 4140 | 4404 |
| itf | 0.959 | 0.960 | 0.965 | 0.954 |
| I.I. (%) | 98.3 | 98.5 | 98.4 | 97.6 |
| $U_n$ | 7.5 | 7.5 | 6.7 | 8.0 |
| MFI (g/10 min.) | 8.4 | 9.4 | 9.9 | 6.2 |
| ASW (g/l) | 517 | 515 | 521 | 520 |

| Example No. | 6 | 7 | 8 | 9 |
|---|---|---|---|---|
| Nature of the electron-donor organic compound (3) | dimethoxy-propane | 2,4,6-tri-methylpyridine (collidine) | triethyl phosphite | hexamethyl-phosphorotriamide |
|  | 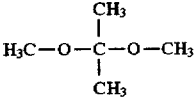 | 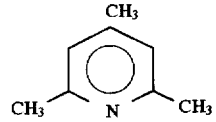 | $P-(OC_2H_5)_3$ | $[(CH_3)_2N]_3P=O$ |
| Quantity of compound (3) (molar ratio compound (3)/DEAC) | 0.05 | 0.05 | 0.02 | 0.02 |
| Method of introduction of the compound | (b) | (a) | (a) | (b) |
| $\alpha$ (gPP/gTiCl$_3$ × h) | 3906 | 4312 | 4500 | 4500 |
| itf | 0.955 | 0.967 | 0.965 | 0.959 |
| I.I. (%) | 98.3 | 98.2 | 98.5 | 96.8 |
| $U_n$ | 6.5 | 6.5 | 7.2 | 9.5 |
| MFI (g/10 min.) | 7.6 | 5.6 | 9.3 | 11.6 |
| ASW (g/l) | 518 | 519 | 529 | 522 |

Comments (a) Introduction of DEAC and of the compound (3) into the autoclave after 30 minutes' preliminary contact at ambient temperature.

(b) successive introductions of DEAC, of the compound (3) and of the preactivated solid catalyst into the autoclave.

These results clearly show the increase in the stereospecificity of the catalyst systems according to the invention (increase in the itf and in the I.I.) without any significant change in their activity.

What is claimed is:

1. A catalytic composition for the polymerization of alpha-olefins, consisting essentially of:

(1) a solid comprising complexed titanium trichloride obtained by a process comprising reducing a titanium compound selected from the group consisting of tetrahalides, tetrahydrocarbyloxides and mixtures thereof to obtain a reduced solid, treating said reduced solid with at least one complexing agent selected from the group consisting of aliphatic ethers and, combining with or following this treatment, activating said reduced solid with at least one agent selected from the group consisting of inorganic halogen compounds, organic halogen compounds, interhalogen compounds and halogens, wherein said solid has been brought into contact with a preactivator comprising a product of reaction of an organoaluminium compound (a) selected from the group consisting of trialkylaluminiums and alkylaluminium chlorides with a compound (b) selected from the group consisting of hydroxyaromatic compounds whose hydroxyl group is sterically hindered to obtain a preactivated solid which is then isolated from a medium in which it was formed;

(2) an organometallic composition selected from the group consisting of the compounds of formula AlR'$_m$X$_{3-m}$ where R' is a hydrocarbon radical containing from 1 to 18 carbon atoms, X is a halogen selected from the group consisting of fluorine, chlorine, bromine and iodine, and m is any number such that $1.5 \leq m \leq 2.5$; and (3) an electron-donor organic compound selected from the group consisting of organic compounds containing oxygen, organic compounds containing nitrogen, organic compounds containing phosphorus and organic compounds containing sulphur and having a molar ratio of the electron-donor compound (3) to the organometallic composition (2) between 0.005 and 1.

2. The catalyst composition according to claim 1, wherein the compound (b) is selected from the group consisting of phenols di-tert-alkylated in the ortho position relative to the hydroxyl group and esters of 3-(3',5'-di-tertbutyl-4'-hydroxyphenyl)propionic acid.

3. The catalyst composition according to claim 1, wherein the complexed titanium trichloride corresponds to the formula:

$$TiCl_3.(AlRCl_2)_x.L_y$$

where R is an alkyl radical containing from 2 to 6 carbon atoms, L is a complexing agent comprising aliphatic ethers whose aliphatic radicals contain from 2 to 8 carbon atoms, x is between 0 and 0.20 exclusive of zero and y is any number from 0.009 to 0.20.

4. The catalyst composition according to claim 1, wherein the compound (3) is an ester.

5. The catalyst composition according to claim 1, wherein the compound (3) is an ether.

6. The catalyst composition according to claim 1, wherein the compound (3) is an amine.

7. The catalyst composition according to claim 1, wherein the compound (3) is a phosphite.

8. The catalyst composition according to claim 1, wherein the compound (3) is an organophosphine oxide derivative.

9. A method for the stereospecific polymerization of alpha-olefins, comprising:

(i) preparing a catalytic composition according to claim 1, and (ii) contacting said catalytic composition with one or more terminally unsaturated olefins such that polymerization of said olefins occurs.

10. The method of claim 9 wherein said one or more terminally unsaturated olefins comprises propylene, 1-butene, 4-methyl-1-pentene or a mixture thereof.

11. A method for the stereospecific polymerization of alpha-olefins, comprising:

(i) preparing a catalytic composition according to claim 3, and (ii) contacting said catalytic composition with one or more terminally unsaturated olefins such that polymerization of said olefins occurs.

12. The method of claim 11 wherein said one or more terminally unsaturated olefins comprises propylene, 1-butene, 4-methyl-1-pentene or a mixture thereof.

13. A catalytic composition for the polymerization of alpha-olefins, consisting essentially of:

(1) a solid comprising complexed titanium trichloride obtained by a process comprising reducing a titanium tetrahalide to obtain a reduced solid, treating said reduced solid with at least one complexing agent selected from the group consisting of aliphatic ethers and, combining with or following this treatment, activating said reduced solid with at least one agent selected from the group consisting of inorganic halogen compounds, organic halogen compounds, interhalogen compounds and halogens, wherein said solid has been brought into contact with a preactivator comprising a product of reaction of an organoaluminium compound (a) selected from the group consisting of trialkylaluminiums and alkylaluminium chlorides with a compound (b) selected from the group consisting of hydroxyaromatic compounds whose hydroxyl group is sterically hindered to obtain a preactivated solid which is then isolated from a medium in which it was formed;

(2) an organometallic composition selected from the group consisting of the compounds of formula $AlR'_mX_{3-m}$ where R' is a hydrocarbon radical containing from 1 to 18 carbon atoms, X is a halogen selected from the group consisting of fluorine, chlorine, bromine and iodine, and m is any number such that $1.5 \leq m \leq 2.5$; and (3) an electron-donor organic compound selected from the group consisting of organic compounds containing oxygen, organic compounds containing nitrogen, organic compounds containing phosphorus and organic compounds containing sulphur and having a molar ratio of the electron-donor compound (3) to the organometallic composition (2) between 0.005 and 1.

14. A method for the stereospecific polymerization of alpha-olefins, comprising:

(i) preparing a catalytic composition according to claim 13, and (ii) contacting said catalytic composition with one or more terminally unsaturated olefins such that polymerization of said olefins occurs.

15. The method of claim 14 wherein said one or more terminally unsaturated olefins comprises propylene, 1-butene, 4-methyl-1-pentene or a mixture thereof.

* * * * *